Oct. 19, 1926.
B. LIEBOWITZ
1,603,963
BRAKE
Filed Sept. 30, 1920   2 Sheets-Sheet 2
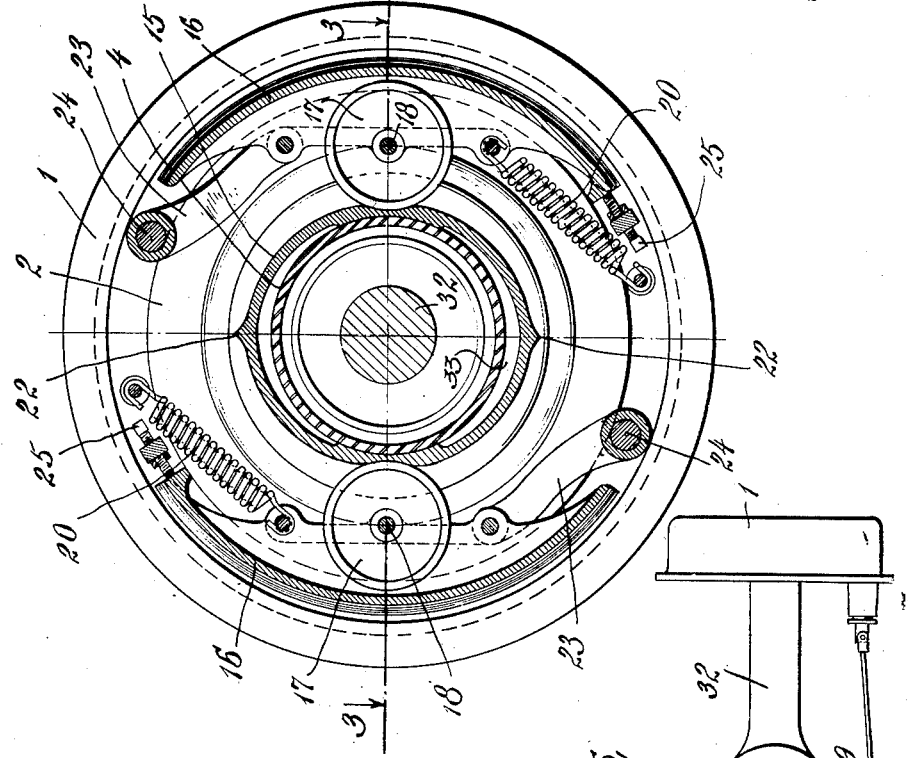
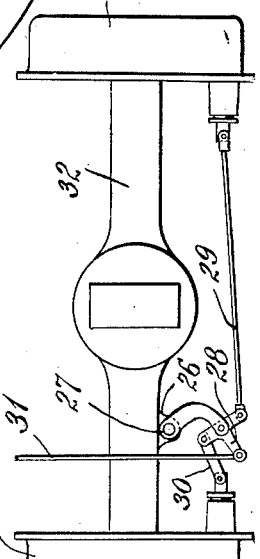
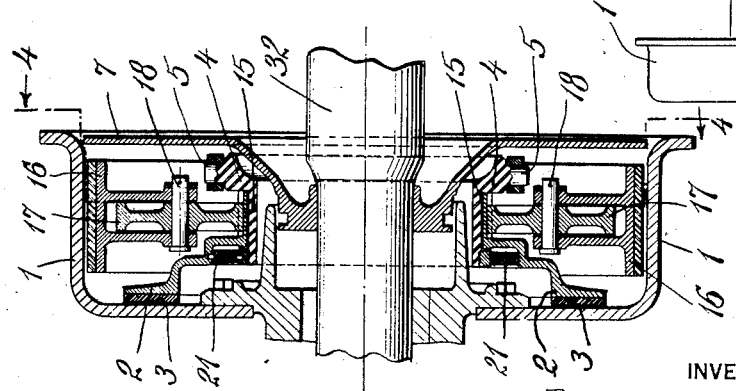
INVENTOR
Benjamin Liebowitz,
BY
ATTORNEY Patented Oct. 19, 1926.

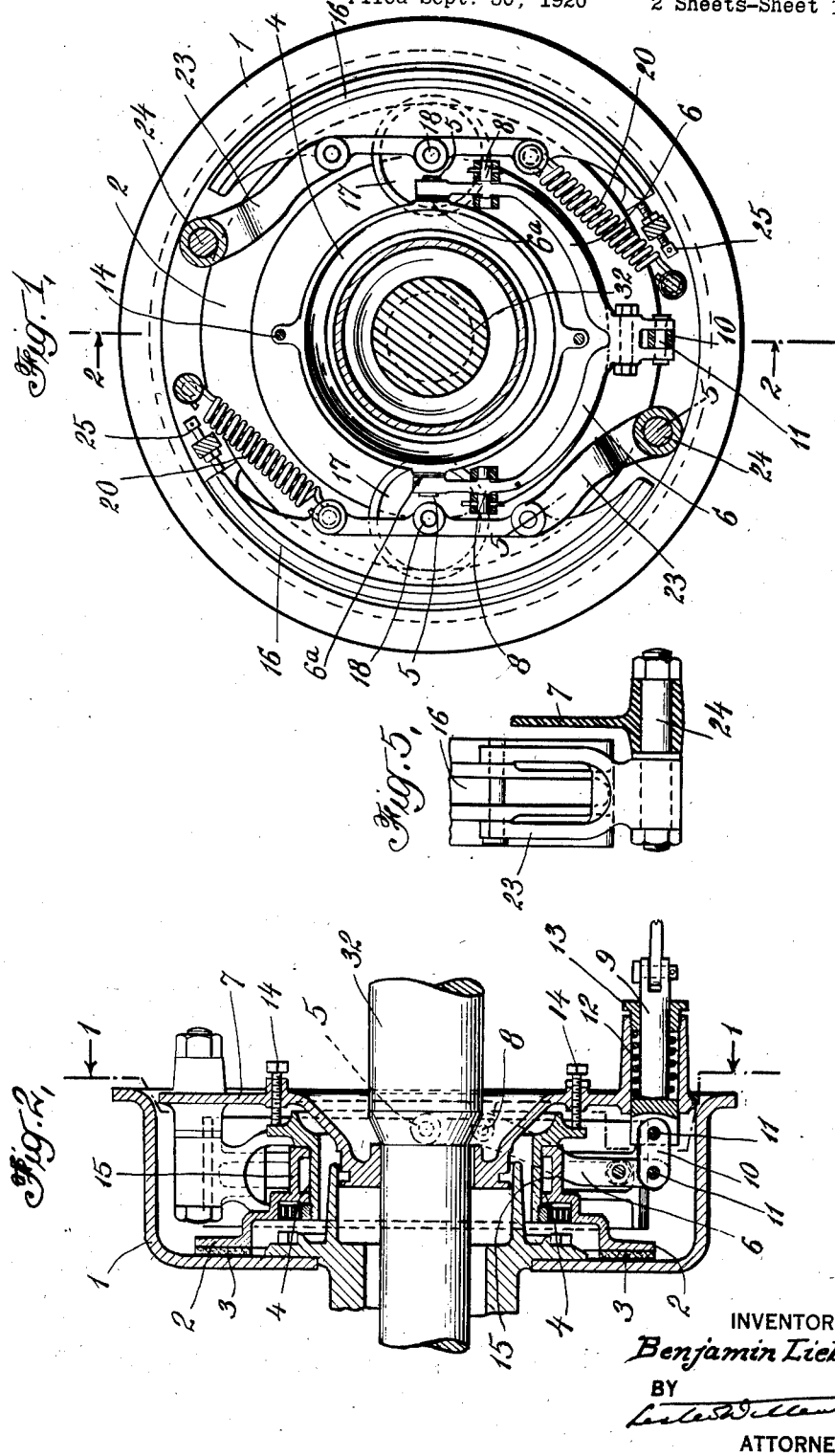

1,603,963

UNITED STATES PATENT OFFICE.

BENJAMIN LIEBOWITZ, OF NEW ROCHELLE, NEW YORK.

BRAKE.

Application filed September 30, 1920. Serial No. 413,683.

My invention relates to brakes of the internal-expanding type, and particularly to such brakes for motor trucks or other automobiles.

The fundamental defect of the present types of brakes, as applied to motor trucks or other heavy automobiles, is that the energy available for setting the brakes is too small. To a minor extent the same is true of the brakes of passenger cars. In order to secure an adequate braking reaction, it has been necessary to multiply the leverage of the brake setting lever to such an extent that the resultant movement of the brake shoes relative to the drum is too small for maintenance of adjustment and for general reliability. My invention overcomes this basic defect by the use of energy external to the operator but controlled by him, this energy being tapped from the kinetic or potential energy of the vehicle itself.

I achieve this result by using a small auxiliary brake which is capable of being set by the operator, and a main brake which is set by reaction of the auxiliary brake. The construction is such that the greater the pressure applied by the operator on the auxiliary brake, the greater is the reaction on the main brake.

Further objects of the invention are to provide an internal-expanding brake of the character described which is simple to operate, thoroughly reliable, and comparatively inexpensive to construct.

These objects, as well as others, are attained by means of the novel features of construction, arrangement and combination of parts, hereinafter described and claimed, and illustrated in the accompanying drawings, in which, Figure 1, is a side elevation looking towards the inside of the brake drum, with the brake spider removed;

Fig. 2, is a section on the vertical line 2—2 of Fig. 1;

Fig. 3, is a section on the horizontal line 3—3 of Fig. 4;

Fig. 4, is a sectional elevation on the line 4—4 of Fig. 3;

Fig. 5, is a detail section on the line 5—5 of Fig. 1, showing the means for anchoring the main brake shoes; and, Fig. 6, is a plan view showing means for simultaneously operating the auxiliary brakes on both driving wheels.

Referring to the drawings, 1 indicates a conventional brake drum having a disc portion and a peripheral flange portion. An auxiliary brake having an annular friction member 2, which is preferably lined with suitable brake lining 3, is disposed adjacent to the inner face of the disc and is operable to frictionally engage the same. The auxiliary brake is rotatably mounted on the cylindrical carrier 4, which is formed with two pins 5, by means of which the carrier is supported. The forked lever 6, pivoted to the brake spider 7, at 8, functions as a support for the carrier and also as means for setting the auxiliary brake. The lever 6 is operated by pulling on the plunger 9 which is connected to said lever through the link 10 mounted on pins 11. The expanding spring 12, acting at its ends against the enlarged foot of the plunger 9 and the sleeve nut 13, respectively, normally maintains the auxiliary brake 2 out of contact with the disc portion of the drum 1. Regulating screws 14 are provided as stops to adjustably limit the desired normal clearance between the auxiliary brake and the drum.

Carried by the auxiliary brake 2 is the two-lobed symmetrical cam 15 by means of which the auxiliary brake operates the main brake-shoes 16. The latter carry hardened rollers 17 mounted on hardened pins 18, so as to reduce the friction between the cam and rollers to a point where the system will not jam. This is a very important feature, as is also the fact that the design is such that the reactions on the cam are exactly balanced. These features insure that the system will release properly when the auxiliary brake is released. If the reactions on the cam were unbalanced, the friction between the auxiliary brake 2 and the carrier 4 would inhibit the angular release. If the friction between the cam and the main brake-shoes 16 is sufficiently reduced, then the pressure of the balanced reactions, due to the springs 20, will be sufficient to effect the angular return. However, I may also employ a spring, such as the spiral spring 21 having one end secured to the member 2 and the other end to the member 4, to assist the angular return.

If lubrication of the various moving parts could be reliably depended upon, then these precautions in design to reduce friction would not be so necessary. It is safe to say, however, that under usual conditions lubrication will be very unreliable, and therefore I have designed the braking system so that it will operate satisfactorily even with a total absence of lubrication. The most important point in this connection is the bearing surface between the auxiliary brake member 2 and the carrier 4. By referring to Fig. 4, it will be seen that space 33 is provided between these parts in which a body of grease may be inserted in the process of assembly, which grease will be sufficient to last for a long time, probably until relining is necessary. Even here, however, the clearance between the parts can be made very liberal, and the balanced reactions insure that there is practically no danger of sticking in case of total failure of the lubrication.

The maximum travel of the cam and auxiliary brake is 90 degrees, stops 22 being preferably provided to prevent greater rotation. The purpose of the symmetry of the cam is to make the brake reversible, that is, so that it will operate in the same manner whether the vehicle is moving forward or backward. The cam is recessed at diametrically opposite points, as seen in Fig. 4, to seat the rollers 17 when the brake is in inactive position so as to keep the brake-shoes 16 away from the drum 1. When the cam 15 is caused to rotate, by frictional contact of the auxiliary brake 2 with the drum 1, the rollers 17 will rise from their seats and ride on the cam so as to expand the brake-shoes 16 against the flange portion of the drum 1 and thereby exert a braking action.

The brake-shoes 16 could be pivoted directly to pins fastened to the brake-spider 7. Doing this, however, would fail to eliminate one of the main disadvantages of the conventional brakes, namely, uneven wear of the brake lining. To obtain more uniform wear of the brake lining, the brake shoes are pivoted to hinges or links 23 which transmit the braking reaction to pins 24 fastened to the brake-spider 7. Uniform wear of the brake lining is further promoted by proper selection of the radii of the brake-shoes.

The main-brake shoes 16 are released by means of the springs 20, which springs also assist in effecting the angular release of the auxiliary brake 2 as heretofore noted. The springs 20 are set at a slightly different angle with the brake-shoes than the links 23, as seen in Figs. 2 and 4, so as to avoid a condition of neutral equilibrium. That is, the springs are arranged so as to tend to pull the brake-shoes 16 against the adjustable screw-stops 25. The object of this construction is to prevent possibility of dragging.

An important feature of my invention resides in the fact that no adjustments are required to compensate for wearing of the main brake-shoe linings, the construction being such as to automatically take up the wear until the brake linings are substantially worn out and relining becomes necessary. The only effect of wear on the main brake-shoe linings is to cause the auxiliary brake 2 and cam 15 to rotate further in setting the main brake. As hereinbefore pointed out, the maximum rotation of these parts is 90 degrees, at which point the main brake-shoes will be substantially worn out and relining will be required.

In Fig. 6, I have shown means for simultaneously operating the two opposite brakes on an axle, and in which 32 indicates the axle and 1—1 the two brake drums. Each of said brakes is similar in construction to the brake herein described and each is provided with a plunger 9 whereby it can be operated. 26 is a lug carried on the axle 32 and 27 is a curved arm having one end pivotally fastened to said lug. A substantially T-shaped connecting piece 28 is pivoted, as shown, to the other end of the arm 27. The two opposite ends of the connecting piece 28 are pivotally connected to tension rods 29 and 30, respectively, by means of which pull may be exerted on the plungers 9. The third end of the connecting piece is pivotally connected to an end of the operating rod 31, the other end of said rod being connected with an ordinary foot-pedal or hand lever (not shown). When pull is exerted on the rod 31, the connecting piece 28 will be rotated on its pivot and will cause the rods 29 and 30 to pull simultaneously, and with substantially equal tension, on the plungers 9—9, thereby setting both brakes.

It will be apparent to those skilled in the art that various modifications in detail may be made in the construction herein described without departing from the scope or spirit of my invention. Furthermore, while the maximum angular motion of the auxiliary or pilot brake 2 should be 90 degrees to secure the best results, it is to be understood that the brake may be designed for a smaller maximum angular movement.

The mode of operation of the brake is as follows: When it is desired to apply the brake the plunger 9 is pulled out, thereby, through the link 10, swinging the forked support 6, pivoted at 8, inward toward the drum 1. The carrier 4, which is mounted by means of the pins 5 on the forked support 6, and which carries the auxiliary or pilot brake 2, moves inward with said support so as to bring the brake 2 into frictional contact with the brake drum 1 and to apply a braking action thereon. Now as the drum continues to rotate, the brake 2 and the cam 15 fixed to said brake, will be carried along with it and will thereby expand the brake-shoes 16 against the flange portion of the drum 1 so as to utilize the kinetic or potential energy of the vehicle itself to set the main brakes. It will be apparent that the amount of energy required of the operator to set the auxiliary or pilot brake is very small in comparison with the energy which is thereby rendered available for setting the main brake; and that the greater the application of the pilot brake, the greater will be the braking reaction of the main brake.

In mounting the auxiliary brake 2 and its carrier 4 on the forked support 6, a clearance 6ª is provided between the fork and the carrier so as to permit said brake to "float" and thereby properly centralize itself with respect to the main brake-shoes 16.

I am aware that prior to my invention brakes have been devised to utilize the motion of the vehicle in setting the brake, but I believe that I am the first to apply this principle of operation to an internal-expanding brake wherein all of operative parts are contained within the brake drum, and whereby the advantages hereinabove pointed out are obtained.

What I claim is:

1. An internal-expanding brake comprising a drum, brake-shoes, a floatingly mounted revoluble member disposed within the drum and capable of being moved axially into frictional contact with the drum, a cam carried by said member and operable upon rotation thereof to set the brake-shoes with equalized pressure.

2. An internal-expanding brake comprising a drum, brake-shoes, a floatingly mounted revoluble member capable of being moved into frictional contact with the drum, a cam carried by said member and operable upon rotation thereof to set the brake-shoes with equalized pressure, and rollers carried by the brake-shoes and bearing on the cam.

3. An internal-expanding brake comprising a drum, brake-shoes, a floatingly mounted revoluble member capable of being moved into frictional contact with the drum, a cam carried by said member and operable upon rotation thereof to set the brake-shoes with equalized pressure, rollers carried by the brake-shoes and bearing on the cam, and springs acting on the brake-shoes to hold the rollers in contact with the cam surface.

4. An internal-expanding brake comprising a drum, a floatingly mounted revoluble member capable of being moved into frictional contact with the drum, a multiple symmetrical cam fixed to rotate with said member, and brake-shoes bearing upon said cam at equidistant points whereby to balance the reactions on said cam.

5. An internal-expanding brake comprising a drum, a revoluble member capable of being moved into frictional contact with the drum, a multiple symmetrical cam connected to rotate with said member, and brake-shoes bearing upon said cam at equidistant points, said cam being floatingly mounted so as to center itself with respect to the brake-shoes.

6. An internal-expanding brake comprising a drum, a floatingly mounted revoluble member capable of being moved into frictional contact with the drum, a symmetrical two lobed cam fixed to rotate with said member, and a pair of oppositely disposed brake-shoes pivotally supported within the drum and bearing on the cam at diammetrically opposite points.

7. In an internal-expanding brake the combination with a drum, and brake shoes, of a floatingly mounted revoluble member capable of being rotated by frictional contact with the drum, a cam carried by said member and operable upon angular motion thereof to set the brake-shoes with equalized pressure, and anti-frictional elements between the brake-shoes and the cam.

BENJAMIN LIEBOWITZ.